United States Patent
Oisel et al.

(10) Patent No.: US 7,203,358 B2
(45) Date of Patent: Apr. 10, 2007

(54) METHOD AND DEVICE FOR MEASURING SIMILARITY BETWEEN IMAGES

(75) Inventors: Lionel Oisel, La Nouaye (FR); Bertrand Chupeau, Rennes (FR); François Le Clerc, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 233 days.

(21) Appl. No.: 10/528,729

(22) PCT Filed: Sep. 12, 2003

(86) PCT No.: PCT/FR03/50053

§ 371 (c)(1),
(2), (4) Date: Mar. 22, 2005

(87) PCT Pub. No.: WO2004/029833

PCT Pub. Date: Apr. 8, 2004

(65) Prior Publication Data

US 2006/0023944 A1    Feb. 2, 2006

(30) Foreign Application Priority Data

Sep. 27, 2002   (FR) ................................. 02 11950

(51) Int. Cl.
*G06K 9/00*   (2006.01)
*G06K 9/46*   (2006.01)
*G06K 9/66*   (2006.01)
*G06F 7/00*   (2006.01)
*G06F 17/30*   (2006.01)

(52) U.S. Cl. .................. 382/170; 382/192; 382/194; 707/6

(58) Field of Classification Search ............. 382/164, 382/170, 171, 173, 181, 192, 194, 305; 707/6
See application file for complete search history.

(56) References Cited

U.S. PATENT DOCUMENTS

| 5,592,572 | A  | * | 1/1997  | Le ............................... 382/289 |
| 6,075,892 | A  | * | 6/2000  | Fan et al. .................... 382/198 |
| 6,108,444 | A  | * | 8/2000  | Syeda-Mahmood .......... 382/186 |
| 6,130,706 | A  | * | 10/2000 | Hart et al. ................... 348/148 |
| 6,674,915 | B1 | * | 1/2004  | Wang ........................... 382/263 |
| 6,738,100 | B2 | * | 5/2004  | Hampapur et al. .......... 348/702 |

OTHER PUBLICATIONS

A.K. Jain et al: "Image retrieval using color and shape", Pattern Recognition, Pergamon Press Inc., Elmsford, NY, US, vol. 29, No. 8, Aug. 1, 1996, pp. 1233-1244.

(Continued)

*Primary Examiner*—Jingge Wu
*Assistant Examiner*—Yubin Hung
(74) *Attorney, Agent, or Firm*—Joseph J. Laks; Ronald H. Kurdyla; Guy H. Eriksen

(57) ABSTRACT

A method is disclosed for measuring similarity between images, comprising the performance of the following steps for each of the images: segmentation of the image into segments, classification of the segments as a function of their orientation to give classes, calculation of a histogram of the number of segments as a function of class, calculation of a histogram of the number of pixels belonging to the segments of one and the same class as a function of class, and comparing, for each image, the histograms calculated above to their respective histograms calculated for each of the rest of the images to give a measurement of similarity.

9 Claims, 2 Drawing Sheets

OTHER PUBLICATIONS

D. Androutsos et al.: "Directional detail histogram for image retrieval", Electronics Letters, IEE Stevenage, GB, vol. 33, No. 23, Nov. 6, 1997, pp. 1935-1936.

H-W. Yoo et al: "Visual Information retrieval system via content-based approach", Pattern Recognition, Pergamon Press Inc., Elmsford, NY US, vol. 35, No. 3, Mar. 2002, pp. 749-769.

Search Report dated May 21, 2004.

* cited by examiner though the images may be locally similar. By considering the segments in the entirety of the image, it is possible to obtain an effective description.

METHOD AND DEVICE FOR MEASURING SIMILARITY BETWEEN IMAGES

This application claims the benefit, under 35 U.S.C. § 365 of International Application PCT/FR03/50053, filed Sep. 12, 2003, which was published in accordance with PCT Article 21(2) on Apr. 8 2004 in French and which claims the benefit of French patent application No. 0211950, filed Sep. 27, 2002.

The invention relates to a method and device for measuring similarity between images.

The field of application is that of the calculation of the similarity between images. This similarity may be used within the framework of a search for images by similarity. It may also be used to estimate clusters of images that are close according to the similarity criterion used. It pertains for example to the construction of video summaries. This consists of a search for similar images in a base consisting of images of a video sequence. The aim is to reduce the number of these images by retaining only a representative for a cluster of images that are decreed to be similar. It also pertains to indexation consisting in selecting index images on the basis of their similarity to other images or quite simply in the search for specific images in the video sequence, on the basis of enquiry images.

BACKGROUND OF THE INVENTION

Numerous studies are interested in the measurement of similarity between images on the basis of attributes assigned to the images. A certain number of them are now defined in the MPEG-7 standard. The invention is interested in particular in the so-called structural attributes. For example, in the latest version of the standard, an attribute of contour type is defined. It is extracted locally from blocks of images on the basis of Gabor filters.

The attributes known from the prior art or proposed in the MPEG-7 standard and the algorithms for processing these attributes for measuring similarity, do not however make it possible, for certain types of sequences, to detect similar images in a satisfactory manner, in so far as they do not take account either of the image in its entirety, or of the details in the image. With a view to clustering images extracted from a video, the similarity measurement must be able to convey the fact that several images correspond to one and the same scene, characterized by a unity of place. An information item characterizing solely the details of the image is not sufficient to fulfil this task. On the other hand an information item characterizing the image solely in its entirety may prove to be unsuitable in the case of partial modification of the staging of the scene, for example by modification of the background of the scene.

SUMMARY OF THE INVENTION

The aim of the invention is to alleviate the aforesaid drawbacks. Its subject is a method of measuring similarity between images, characterized in that it performs, for each image, the following steps:

segmentation of the image,
classification of the segments as a function of their orientation to give classes,
calculation of a histogram of the number of segments as a function of class,
calculation of a histogram of the number of pixels belonging to the segments of one and the same class as a function of class,
comparison of the histograms of each image to give a measurement of similarity.

According to a particular implementation, the process is characterized in that it also calculates a histogram corresponding to the distribution of the segments about the centre of gravity of each class.

According to a particular embodiment, to calculate this histogram, it performs a calculation of the standard deviation of the distances from the middles of the segments of a class to the centre of gravity of the class considered.

According to a particular implementation, the comparison of the histograms consists of a subtraction of the ordinates, class by class and of a sum, over the set of classes, of the values obtained for each class.

According to a particular implementation, the histograms are coded according to the MPEG-7 standard.

The invention also relates to a method of clustering images of a database, characterized in that the clustering is performed as a function of the measurements of similarity according to the method described above to give clusters of images.

The invention also relates to a method of creating video summaries, characterized in that it selects at least one of the images of at least one cluster calculated according to the above method.

The invention also relates to a method of video indexation, characterized in that it selects at least one of the images of at least one cluster calculated according to the above method, as indexation image.

The invention also relates to a device for measuring similarity between images, characterized in that it comprises a circuit for processing and for calculation of histograms receiving digital data defining these images so as to perform, for each of them, the following operations:

segmentation of the image,
classification of the segments as a function of their orientation to give classes,
calculation of a histogram of the number of segments as a function of class,
calculation of a histogram of the number of pixels belonging to the segments of one and the same class as a function of class,
comparison of the histograms of each image to give a measurement of similarity.

The main advantage of the invention is the implementation of powerful algorithms for characterizing an image and measuring the similarity between images on the basis of these algorithms, by virtue of the joint use of attributes based on orientation of contours making it possible to characterize the number of segments, their size and also their distribution as a function of orientation.

The global description of the image is obtained on the basis of the histograms of the orientations of the segments in the image, hence without taking account of the position of these segments in the image, and the local description is obtained on the basis of a measure of centres of gravity of classes of segments, which corresponds to the relative positions of the various segments of one and the same class.

The use of structural attributes such as these makes it possible to characterize the image both locally and globally, thus improving the effectiveness in the search for similarity of images. Specifically, the dimensions of the similar objects may be very different from one image to another, from one shot of the sequence to another.

BRIEF DESCRIPTION OF THE DRAWINGS

Other features and advantages of the invention will become clearly apparent in the following description given by way of nonlimiting example, and offered in conjunction with the appended figures which represent.

DESCRIPTION OF PREFERRED EMBODIMENTS

The method carries out a segmentation of the image. The "object" approach does not however exist here. It involves determining segments in the image which are approximations of the actual contours in the image, for example on the basis of measurements of gradients, without worrying about the fact that they do or do not belong to a particular object in the image.

Figure 1:
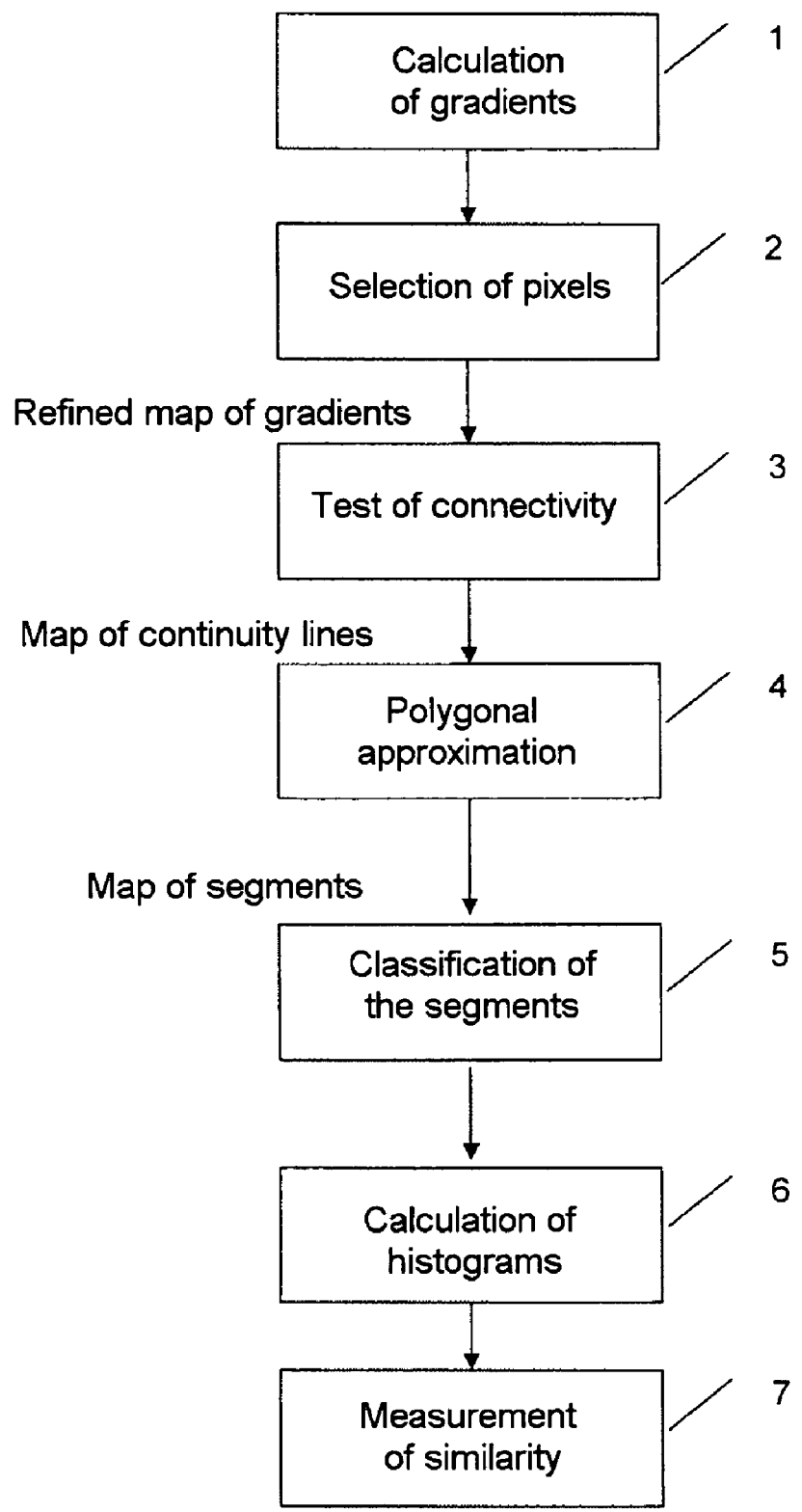
FIG. 1, a flowchart of the method according to the invention.

FIG. 1 represents a flowchart defining the main steps of the method of calculating histograms of attributes characterizing an image.

A first phase which is a preprocessing of the image consists of a detection of contours in the image so as to obtain a map of contours and a segmentation of these contours so as to obtain a map of segments. The second phase carries out a calculation of the attributes for the detection of similarity.

An image to be processed is transmitted to a first step referenced 1 in the flowchart of FIG. 1. This step of the method carries out a calculation of gradients in the image. A gradients detection filter is applied to the image to give at each point a measurement of gradient. A map of vertical gradients and a map of horizontal gradients are thus calculated. The norm of the gradients that is obtained on the basis of these maps, the square root of the sum of the squares of the horizontal and vertical gradient values attributed to a pixel, is also utilized.

Step 2 carries out a selection of the pixels on the basis of the gradient values calculated in the previous step, compared with thresholds. This selection is refined through that of the points of greatest contrast in a given neighbourhood window. The aim is to remove thick contours by selecting, in the neighbourhood of a pixel, the pixels having the steepest gradients, by considering the values of the horizontal and vertical gradients. This also involves favouring the pixels neighbouring a pixel already selected as a contour. The isolated contour points are eliminated. We obtain, at this stage, a binary map of contours, each pixel of the image is labelled as contour or otherwise.

A test of connectivity is performed on the binary map of contours so as to gather together the neighbouring pixels, so as to thus constitute contour lines. To do this, a procedure for labelling as adjoining components is implemented in the next step 3.

Two pixels are declared adjoining if there exists an uninterrupted path of contour pixels linking these two pixels. Contour pixels are thus "chained together" in such a way as to obtain a continuity line. The adjoining pixels are labelled, each pixel touching another pixel being marked with the same label. A list of adjoining components is obtained for each label, this list being the coordinates of the various pixels of a continuity line relating to a label.

To chain each contour together from one end to the other, it is necessary to eliminate multiple points, that is to say the junctions of contour lines. An algorithm tests for the presence of junctions and eliminates them. This step is carried out by tracking contours over each adjoining component identified. The traversal of the pixels belonging to a given adjoining component is done gradually. A combination of filters makes it possible to ascertain whether the current pixel corresponds to a junction between the main contour and a secondary contour. A pixel having been categorized as a junction is eliminated from the map of contour pixels, thus detaching the secondary contour from the main contour. The secondary contour is replaced in the list of adjoining components to be traversed. The tracking of contours is then continued along the main contour.

At this stage, we have a map of nonrectilinear continuity lines.

The next step 4 of the preprocessing procedure is a polygonal approximation of these chained contours so as to approximate each contour line by a set of connected segments.

Figure 2:
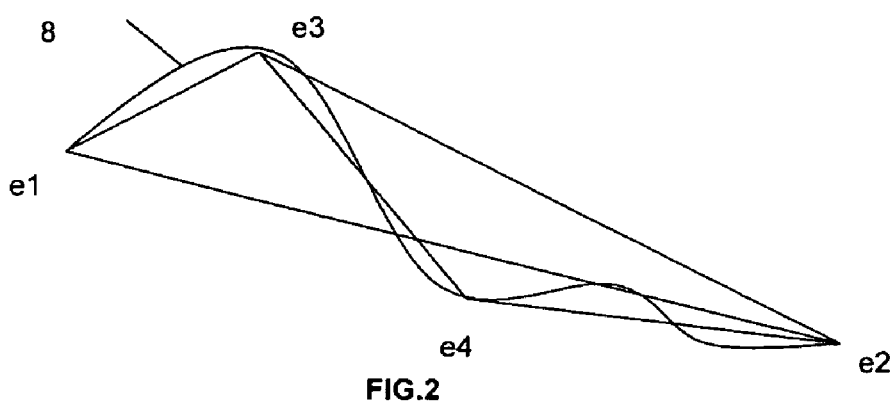
FIG. 2, a method of polygonal approximation.

FIG. 2 represents a method of polygonal approximation of a chained contour. For a given contour referenced 11, we search for the point e3 giving the maximum distance between the points of the contour and the segment formed by the ends of this contour e1 and e2. If this distance is greater than a threshold, the contour is approximated by two segments [e1, e3] and [e3, e2]. The procedure is repeated until the distances from the point to the segment are less than the fixed threshold.

On completion of this step, we have, for an image, a segment map consisting of a set of segments whose orientation can then be calculated. An example of a map of segments is represented at the top right of FIG. 3.

The second phase consists of a calculation and a utilization of the attributes relating to this segment map.

Step 5 calculates, for each segment of the map of segments, the angle between its direction and the horizontal. The angle obtained, lying between 0 and 180 degrees, is then quantized to obtain a reduced number of categories or classes of angles. For example, the angles obtained are clustered into 36 classes, the quantization interval being 5 degrees or, stated otherwise, a class corresponds to a width of 5 degrees.

Histograms relating to three attributes are now calculated during step 6, utilizing the segment orientation information obtained previously.

a histogram of the number of segments as a function of orientation.

The various classes are represented as abscissa and the occurrences as ordinates.

a histogram of the total number of pixels belonging to segments of like orientation as a function of their orientation.

The ordinates correspond to the sum of the lengths of the segments of the class, for a given class.

a histogram corresponding to the distribution of the segments about the centre of gravity of each class, by calculating the standard deviation of the distances from the middles of the segments to the centre of gravity.

The centre of gravity $G_i$ of class $C_i$ is obtained by calculating the barycentre of the middles $M(s_j)$ of the segments $s_j$. The weight associated with each middle is equal to the number of pixels $n(s_j)$ making up the segment:

$$G_i = \frac{\sum\limits_{s_j \in C_i} n(s_j) * M(s_j)}{\sum\limits_{s_j \in C_i} n(s_j)}$$

The ordinates H(i) correspond to the standard deviation of the Euclidean distances $d(G_i, M(s_j))$ between the barycentre or centre of gravity of the class $C_i$ considered and the centre of each segment of the class:

$$H(i) = \sqrt{\frac{\text{card}(C_i) * \sum\limits_{s_j \in C_i} d(G_i, M(s_j))^2 - \left(\sum\limits_{s_j \in C_i} d(G_i, M(s_j))\right)^2}{\text{card}(C_i) * \text{card}(C_i)}}$$

where card is the cardinal function returning the number of segments of the class considered.

The distribution is put into the form of a histogram, that is to say of vectors of values, thus allowing its utilization within the framework of the MPEG7 standard which defines the coding of such histograms.

In order to more easily combine the information, the histograms are normalized, for example on the basis of the maximum values found.

The three histograms of the attributes characterizing the image are utilized for the similarity measurementments, step 7.

Three histograms are calculated for a first image which is for example an enquiry image and three other histograms for a second image which is an image in a database. The measurement of similarity between the two images $I_1$ and $I_2$, that is to say the calculation of the distance between these images may then be performed by simple subtraction of the ordinates, class by class, for each type of histogram $H^k$ of size $m_k$:

$$d_k(H_1^k, H_2^k) = \frac{\sum\limits_i |H_1^k(i) - H_2^k(i)|}{m_k}$$

A similarity indicator $S(I_1, I_2)$ is for example the sum of the values obtained by these subtractions, for the whole set of histograms:

$$S(I_1, I_2) = \frac{\sum\limits_{k=1,2,3} d_k(H_1^k, H_2^k)}{3}$$

The similarity measurement may be improved by comparing the class also with neighbouring classes of the histogram of the other image, with a weighting factor.

The histogram comparison uses for example a metric of cross quadratic type making it possible to circumvent the small variations in global orientation between two successive images, for example during a small rotation of the camera.

Figure 3:
FIG. 3, an exemplary search for similarity.

An exemplary search for similar images is given in FIG. 3, showing, at the top left, the image considered, its associated map of contours and of segments, as well as the images recognized as the most similar in a base of 150 images arising from two different sequences.

The main characteristic of these histograms is therefore of providing a description of the images which is both global and local. It is thus possible, by virtue of the global description, to differentiate globally structured images, for example images of towns characterized by orientations of horizontal and vertical segments, from image is of countryside characterized by orientations of segments that are more random. However, it is also possible, by virtue of the local description, to differentiate locally structured images, part of the image is for example devoted to a building, another to a wood, from less structured images, for example a house in the middle of the forest.

The calculation of the segments, in the previous description, is performed over the values of luminance of the image. It is of course just as conceivable to perform such a calculation for each of the colour components of the image. If the calculations need more processing capacity, on the other hand the production of histograms based on colour makes it possible to improve the effectiveness of the method.

Three histograms are utilized here to characterize the image. It is of course possible to utilize just one of them or a combination of two of them to calculate the similarity of images, without departing from the field of the invention.

The segment orientations utilized may be the angles formed with reference straight lines other than the horizontal. The dimensions of the classes may be less than or greater than 5 degrees, depending on the calculation power or time available or the quality of measurement desired.

The invention claimed is:

1. Method of measuring similarity between images, comprising:
    performing, for each of the images, the following steps:
        (a) segmentation of the image into segments,
        (b) classification of the segments as a function of their orientation to give classes,
        (c) calculation of a histogram of the number of segments as a function of class,
        (d) calculation of a histogram of the number of pixels belonging to the segments of one and the same class as a function of class,
    comparing, for each image, the histograms calculated above to their respective histograms calculated for each of the rest of the images to give a measurement of similarity.

2. Method according to claim 1, also calculating a third histogram corresponding to the distribution of the segments about the centre of gravity of each class.

3. Method according to claim 2, wherein, to calculate the third histogram, it performs a calculation of the standard deviation of the distances from the middles of the segments of a class to the centre of gravity of the class considered.

4. Method according to claim 1, characterized in that wherein the comparison of the histograms consists of a subtraction of the ordinates class by class and of a sum, over the set of classes, of the subtraction result obtained for each class.

5. Method according to claim 1, wherein the histograms are coded according to the MPEG-7 standard.

6. Method of clustering images of a database, wherein the clustering is performed as a function of the measurements of similarity according to the method of claim 1 to give clusters of images.

7. Method of creating video summaries, implementing a selection of at least one of the images of at least one cluster calculated according to the method of claim 6.

8. Method of video indexation, implementing a selection of at least one of the images of at least one cluster calculated according to the method of claim 6, as indexation image.

9. Device for measuring similarity between images, comprising a circuit capable of receiving digital data defining the images performing, for each of the images, the following steps:
  (a) segmentation of the image into segments,
  (b) classification of the segments as a function of their orientation to give classes,
  (c) calculation of a histogram of the number of segments as a function of class,
  (d) calculation of a histogram of the number of pixels belonging to the segments of one and the same class as a function of class, comparing, for each image, the histograms calculated above to their respective histograms calculated for each of the rest of the images to give a measurement of similarity.

* * * * *